United States Patent
Jetcheva et al.

(10) Patent No.: US 9,212,933 B2
(45) Date of Patent: Dec. 15, 2015

(54) SMART GRID ELECTRICITY USAGE MONITORING

(75) Inventors: Jorjeta G. Jetcheva, San Jose, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 649 days.

(21) Appl. No.: 13/495,211

(22) Filed: Jun. 13, 2012

(65) Prior Publication Data
US 2013/0338949 A1 Dec. 19, 2013

(51) Int. Cl.
*G01D 4/00* (2006.01)
*G06Q 10/04* (2012.01)
*G06Q 50/06* (2012.01)
*G06Q 10/06* (2012.01)

(52) U.S. Cl.
CPC .............. *G01D 4/004* (2013.01); *G06Q 10/06* (2013.01); *G06Q 50/06* (2013.01); *Y02B 90/242* (2013.01); *Y02B 90/245* (2013.01); *Y02B 90/248* (2013.01); *Y04S 20/322* (2013.01); *Y04S 20/40* (2013.01); *Y04S 20/52* (2013.01)

(58) Field of Classification Search
CPC ....... G01D 4/002; G01D 4/004; G06Q 50/06; G06Q 10/06; Y04S 20/52; Y04S 20/322; Y04S 20/40; Y04S 20/30; Y04S 20/32; Y04S 20/327; Y04S 20/42; Y02B 90/248; Y02B 90/242; Y02B 90/245; Y02B 90/24
USPC .......... 702/60–62; 340/870.02, 3.1, 3.3, 3.31, 340/3.32; 700/286, 291, 295
See application file for complete search history.

(56) References Cited

U.S. PATENT DOCUMENTS

| | | |
|---|---|---|
| 2008/0167756 A1 | 7/2008 | Golden et al. |
| 2011/0061015 A1* | 3/2011 | Drees et al. .................... 715/771 |
| 2011/0172841 A1* | 7/2011 | Forbes, Jr. .............. G01D 4/004 700/292 |
| 2012/0245752 A1* | 9/2012 | Borrett et al. ................. 700/295 |

OTHER PUBLICATIONS

European Search Report dated Aug. 23, 2013 in application No. 13160836.6.
ZigBee Alliance, Global Inventures, Jun. 12, 2012, <http://www.zigbee.org/>.
HomePlug Alliance, HomePlug Powerline Alliance, Jun. 12, 2012, <https://www.homeplug.org/home/>.
Hammerstrom et al., "Grid Friendly Appliance Project", Pacific Northwest GridWise Testbed Demonstration Projects, Pacific Northwest National Laboratory, Oct. 2007, PNNL-17079, <http://www.pnl.gov/main/publications/external/technical_reports/PNNL-17079.pdf>.

(Continued)

*Primary Examiner* — Manuel L Barbee
(74) *Attorney, Agent, or Firm* — Maschoff Brennan

(57) ABSTRACT

An electricity monitoring system of monitoring electricity usage within a unit. The electricity monitoring system may include a transceiver module configured to receive an electricity usage report from a smart device associated with a unit. The electricity usage report may indicate electricity usage for the smart device. The electricity monitoring system may also include a determination module configured to generate a unit electricity usage report for the unit based on the received electricity usage report. The unit electricity usage report may indicate electricity usage for the unit. The transceiver module may be further configured to transmit the unit electricity usage report to a provider of electricity for the unit.

17 Claims, 7 Drawing Sheets

(56) References Cited

OTHER PUBLICATIONS

"Communication Modularity: A Practical Approach to Enabling Residential Demand Response", Electric Power Research Institute White Paper, May 2011, <http://www.usnap.org/UserFiles/EPRI/%20Project%20Whitepaper.pdf>.

"Table US-1. Electricity Consumption by End Use in U.S. Households", Engergy Information Administration, 2001, <http://www.eia.gov/emeu/reps/enduse/er01_us_tab1.html>.

Bidgely, MyEnerSave Inc., Jun. 12, 2012, <http://bidgely.com>.

Demand Response Research Center, Lawrence Berkeley National Laboratory, U.S. Department of Energy, Jun. 12, 2012, <http://drrc.lbl.gov/>.

Kim et al., "ViridiScope: Design and Implementation of a Fine Grained Power Monitoring System for Homes", ACM Ubicomp, 2009, Proceedings of the 11th international conference on Ubiquitous computing, pp. 245-254.

Molina-Markham et al., "Private Memoirs of a Smart Meter", ACM BuildSys, 2010, Proceedings of the 2nd ACM Workshop on Embedded Sensing Systems for Energy-Efficiency in Building, pp. 61-66.

Gupta et al., "Electrisense: Single-Point Sensing Using EMI for Electrical Event Detection and Classification in the Home", ACM Ubicomp 2010, Proceedings of the 12th ACM international conference on Ubiquitous computing, pp. 139-148.

Hart, "Non-intrusive Appliance Load Monitoring", IEEE, Dec. 1992, vol. 80, Issue 12, pp. 1870-1891.

Jiang et al., "Design and Implementation of a High-Fidelity AC Metering Network", ACM IPSN 2009, Proceedings of the 2009 International Conference on Information Processing in Sensor Networks, pp. 253-264.

Marchiori et al., "Using Circuit-Level Power Measurements in Household Energy Management Systems", ACM Buildsys 2009, Proceedings of the First ACM Workshop on Embedded Sensing Systems for Energy-Efficiency in Buildings, pp. 7-12.

\* cited by examiner

SMART GRID ELECTRICITY USAGE MONITORING

FIELD

The embodiments discussed herein are related to smart grids.

BACKGROUND

Electricity usage continues to rise as more consumer products require electricity to operate. One challenge with rising electricity usage faced by providers of electricity, such as a utility company, is predicting electricity demand. If more electricity is produced than used, the extra electricity may be wasted because it may not be able to be stored effectively. Furthermore, if more electricity is produced than used, a voltage frequency of nodes within a power grid may exceed their normal operating ranges, resulting in failure or reduced life of the nodes.

On the other hand, if not enough electricity is produced, additional power production operations may be used to compensate for the reduced production. These additional power production operations may be very expense to operate and/or not efficient. If the additional power production cannot compensate for the under-production, the voltage frequency at the nodes within the power grid may drop below their normal operating range, which may lead to brownouts or even blackouts in service areas of an electricity provider.

Providers of electricity may also face a challenge in predicting electricity demand as renewable electricity generation becomes more prevalent on a localized small scale format, such as at homes or business.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, an electricity monitoring system of monitoring electricity usage within a unit may include a transceiver module configured to receive an electricity usage report from a smart device associated with a unit. The electricity usage report may indicate electricity usage for the smart device. The electricity monitoring system may also include a determination module configured to generate a unit electricity usage report for the unit based on the received electricity usage report. The unit electricity usage report may indicate electricity usage for the unit. The transceiver module may be further configured to transmit the unit electricity usage report to a provider of electricity for the unit.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein may include an electricity monitoring system of managing electricity usage within a unit, such as a residential dwelling or a commercial building. The electricity monitoring system may be configured to generate a unit electricity usage report that indicates the electricity usage for the unit. The unit electricity usage report may also include a prediction of future electricity usage for the unit. The electricity monitoring system may send the unit electricity usage report to a provider of electricity for the unit, such as a utility company. The provider of electricity may base its electricity generation needs on the received unit electricity usage report and other unit electricity usage reports received from other units in the service area of the provider of electricity.

The electricity monitoring system may generate a unit electricity usage report based on electricity usage reports the electricity monitoring system receives from smart devices, such as appliances, consumer electronic devices, and other devices. The smart devices may be configured to compile and transmit an electricity usage report, which indicates their electricity usage and/or predicted electricity usage, to the electricity monitoring system. The electricity monitoring system may use the electricity usage reports from the smart devices alone or together with an indication of electricity usage of one or more non-smart devices associated with the unit and electricity generated at the unit to determine the electricity usage of the unit. In this manner, each unit within a service area of an electricity provider may provide a fine-grain electricity demand indication or prediction to the electricity provider, allowing for increased accuracy in matching electricity generation with demand.

Embodiments of the present invention will be explained with reference to the accompanying drawings.

Figure 1:
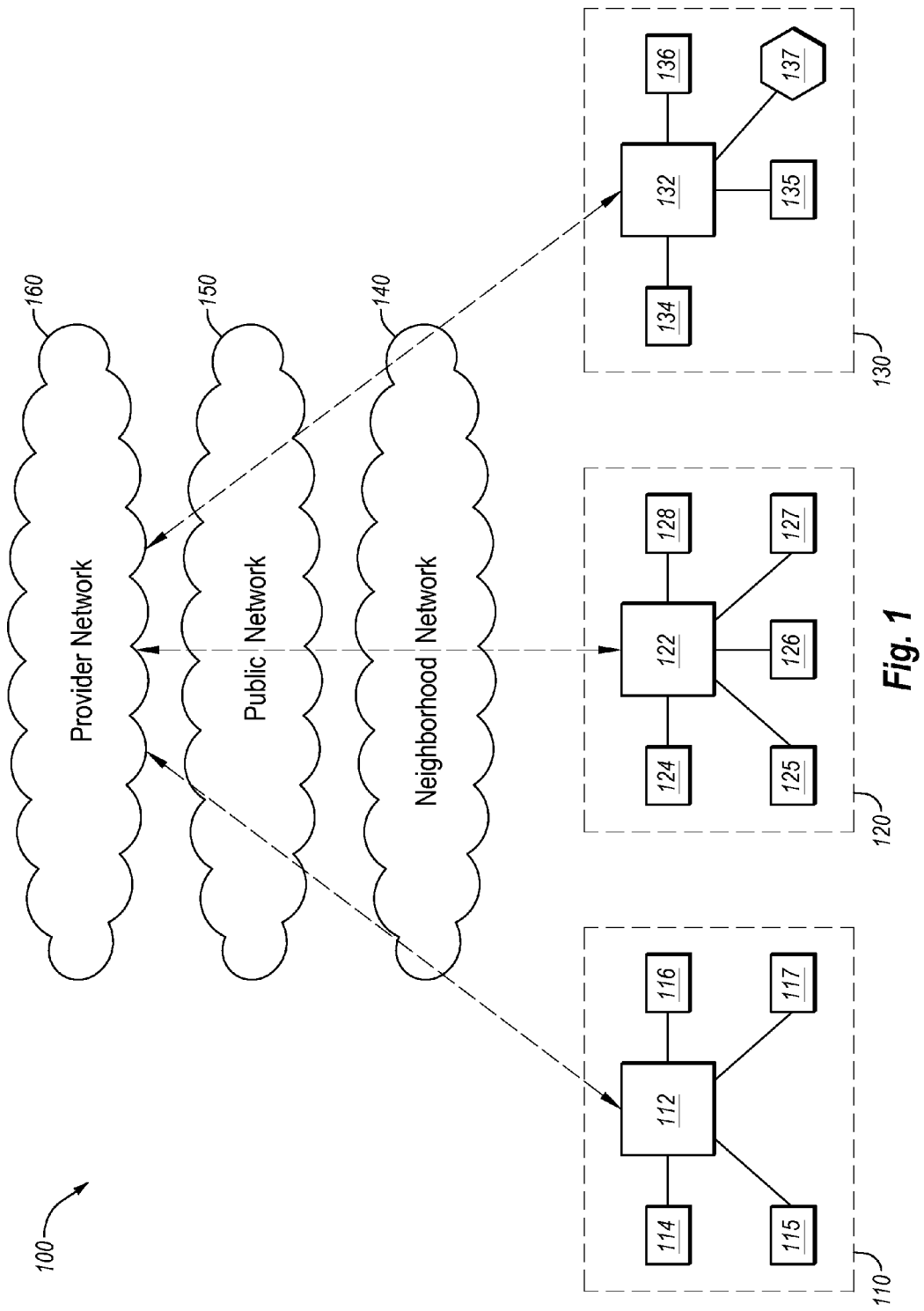
FIG. 1 is a block diagram of an example smart grid.

FIG. 1 is a block diagram of an example smart grid 100, arranged in accordance with at least some embodiments described herein. The smart grid 100 may include multiple units 110, 120, 130, to which an electricity provider provides electricity. The units 110, 120, 130 may be the same types of units or different types of units and may be residential dwellings, such as, but not limited to, single family homes, apartment complexes, condominiums, townhomes, and other residences; commercial buildings, such as, but not limited to, stores and offices; or the like or any combination thereof. The three units 110, 120, 130 within the smart grid 100 are for illustrative purposes only. A smart grid may contain hundreds to millions of units.

Each of the units 110, 120, 130 may contain a respective electricity monitoring system 112, 122, 132. Each of the units 110, 120, 130 may also contain one or more smart devices, such as smart devices 114, 115, 116, 117 of the unit 110, smart devices 124, 125, 126, 127, 128 of the unit 120, and smart devices 134, 135, 136 of the unit 130. The unit 130 may also contain an electricity generator 137, such as a renewable electricity generator that may use sunlight, wind, rain, tides, and/or geothermal heat to generate electricity.

The smart devices 114-117, 124-128, 134-136 may include devices configured to consume electricity and to generate an electricity usage report. Smart devices may include appliances; such as, refrigerators, washer, dryers, stoves, ovens, microwaves, dishwashers, toasters, coffee makers, water heaters, space heaters, furnaces, air conditioning units, among others; consumer electronic devices, such as sound systems, DVD and blue-ray players, televisions, desktop computers, laptop computers, cable boxes, gaming consoles, among others; and other devices. The electricity usage report generated by a smart device may indicate electricity usage of a smart device based on a current operational profile for a smart device. For example, a washer may know the amount of electricity it consumes for a period of time when a certain cycle or mode is selected. The electricity usage report may indicate the electricity usage of the washer for this time period. Alternately or additionally, the electricity usage report generated by a smart device may indicate a current operational profile for a smart device and not indicate electricity usage.

In some embodiments, an electricity usage report may indicate predicted electricity usage of a smart device based on a current operational profile of the smart device and/or a user's behavior with respect to the smart device. For example, a microwave may know the amount of electricity it consumers when a user of the microwave sets the timer for a certain amount of time. The microwave, however, may predict that less electricity may be used based on a pattern of the user of the microwave not allowing the microwave to run for the full time on the timer. The electricity usage report may indicate the electricity usage of the microwave and/or the predicted electricity usage of the microwave.

After generating an electricity usage report, each of the smart devices 114-117, 124-128, 134-136 may also be configured to send the electricity usage report to their corresponding electricity monitoring system 112, 122, 132.

The electricity monitoring systems 112, 122, 132 may be configured to monitor electricity usage of their respective units 110, 120, 130 and to generate unit electricity usage reports indicating the electricity usage and/or predicted electricity usage of their respective units 110, 120, 130. For ease in explanation, reference is now made only to the electricity monitoring system 132. The other electricity monitoring systems 112, 122 may function similar to the electricity monitoring system 132.

The electricity monitoring system 132 may be configured to receive the electricity usage reports from the smart devices 134, 135, 136. If the electricity usage reports from the smart devices 134, 135, 136 indicate a current operational profile for the smart devices 134, 135, 136 but do not indicate electricity usage for the smart devices 134, 135, 136, the electricity monitoring system 132 may determine electricity usage of the smart devices 134, 135, 136 based on the current operational profile of the smart devices 134, 135, 136. The electricity monitoring system 132 may also be configured to detect electricity generation, if any, of the electricity generator 137. Alternately or additionally, the electricity monitoring system 132 may be configured to detect a change, if any, in electricity usage of non-smart devices associated with the unit 130. For example, the electricity monitoring system 132 may detect a change in electricity usage of a non-smart device such as a light bulb, when the light bulb is turned on or off. Based on the received electricity usage reports from the smart devices 134, 135, 136, determined electricity usage of the smart devices 134, 135, 136 based on the received electricity usage reports, the detected electricity generation, and the detected change in electricity usage of non-smart devices associated with the unit 130, the electricity monitoring system 132 may generate the unit electricity usage report reflecting the electricity usage of the unit 130.

In some embodiments, the electricity monitoring system 132 may also be configured to predict the electricity usage of the unit 130 in the future. The electricity monitoring system 132 may predict the electricity usage of the unit 130 based on the received electricity usage reports, detected electricity generation, detected electricity usage of non-smart devices, past human behavior that affected an amount of electricity used by the unit 130, among other factors. In this manner, the unit electricity usage report may provide a fine-grain electricity demand indication or prediction for the unit 130.

Referring again to the electricity monitoring systems 112, 122, 132, after generating the unit electricity usage reports, the unit electricity usage reports are transmitted to a provider of electricity for the units 120, 130, 140. The unit electricity usage reports may be transmitted to the provider of electricity by way of one or more of a neighborhood network 140, a public network 150, and a provider network 160. In some embodiments, the unit electricity usage reports are transmitted to the provider of electricity for the units 120, 130, 140 only if the report indicates a change in electricity usage that is above a threshold. Sending reports when a change in electricity usage is above a threshold may assist in reducing network traffic for the networks through which unit electricity usage reports are sent to the provider of electricity.

The neighborhood network 140 may be formed by a compilation of network elements. In some embodiments, the network elements may be smart meters associated with the units 120, 130, 140. A smart meter may include an electricity meter used by the provider of electricity to determine the electricity usage of a unit. In some embodiments, the neighborhood network 140 may be in communication with a public network 150, such as the World Wide Web, through which the neighborhood network 140 communicates with the provider network 160. The electricity monitoring systems 112, 122, 132 may use the network protocols and backbone used by the smart meters within the neighborhood network 140 to send the unit electricity usage reports to the provider network 160. Alternately or additionally, the electricity monitoring systems 112, 122, 132 may include networking elements and may form the neighborhood network 140. Alternately or additionally, the electricity monitoring systems 112, 122, 132 may each be connected directly to the public network 150 or to the provider network 160. Providing a provider of electricity with a fine-grain electricity demand indication or prediction may allow for the provider of electricity to better match electricity generation with demand. By better matching electricity generation with demand, over and under production of electricity may be avoided.

FIG. 1 illustrates each of the units 110, 120, 130 containing different numbers of smart devices. More generally, each unit 110, 120, 130 may contain the same or a different number of smart devices or a subset of the units 110, 120, 130 may contain the same or a different number of smart devices. FIG. 1 also illustrates each unit 110, 120, 130 containing an electricity monitoring system and one or more smart devices. In other embodiments, one or more units within the smart grid 100 may not contain an electricity monitoring system and/or smart devices. Alternately or additionally, a unit within the smart grid 100 may contain an electricity monitoring system and may not contain any smart devices. Alternately or additionally, units within the smart grid 100 may or may not contain electricity generators. All different configurations of units within a smart grid are contemplated by this disclosure.

Figure 2:
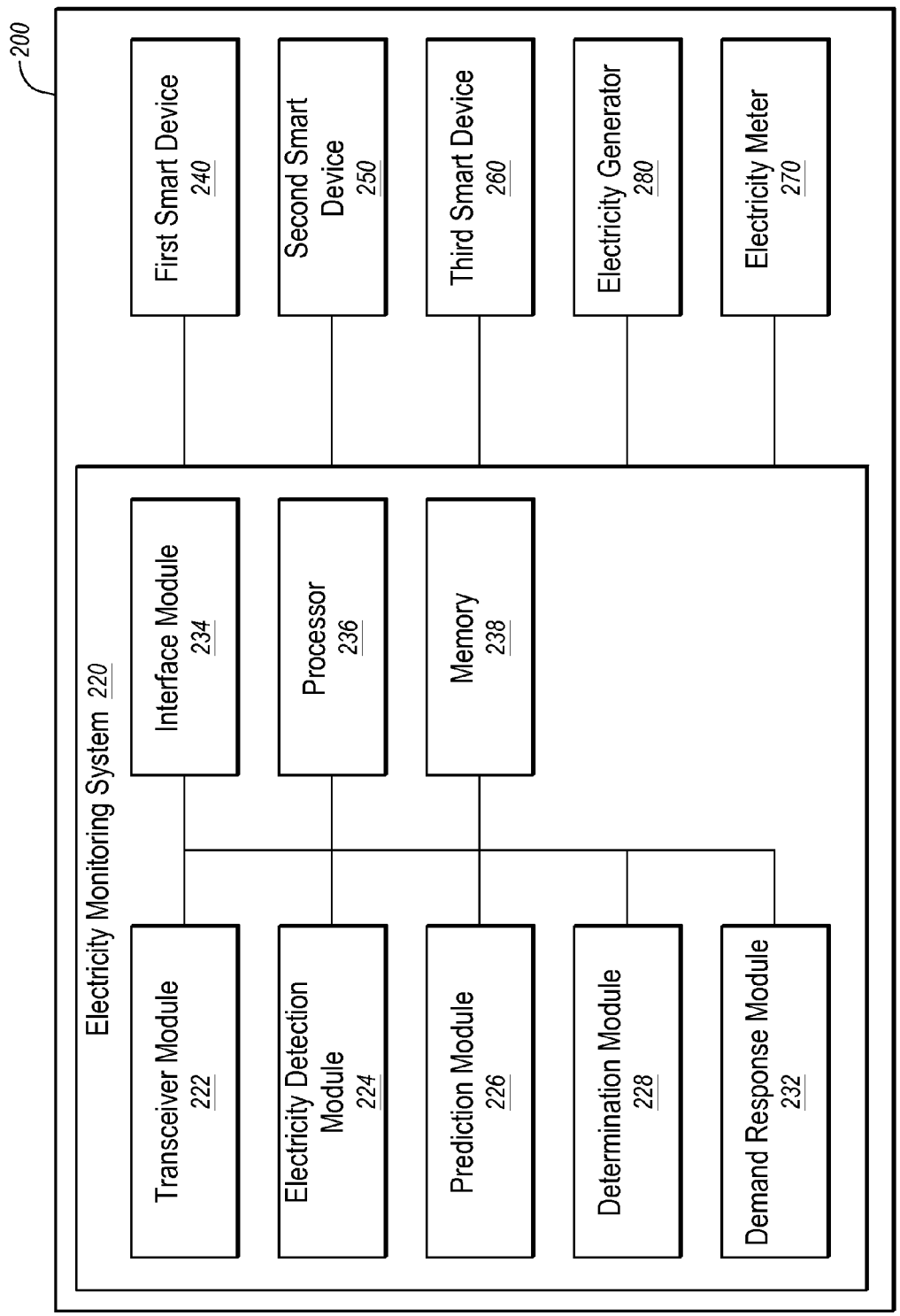
FIG. 2 is a block diagram of an example electricity monitoring system associated with a unit that may be included in the smart grid of FIG. 1.

FIG. 2 is a block diagram of an example electricity monitoring system 220 associated with a unit 200 that may be included in the smart grid 100 of FIG. 1, arranged in accordance with at least some embodiments described herein. Along with the electricity monitoring system 220, a first smart device 240, a second smart device 250, a third smart device 260, an electricity generator 280, and an electricity meter 270 may also be associated with the unit 200. In some embodiments, the electricity monitoring system 220 may be similar and/or correspond to the electricity monitoring systems 112, 122, 132 of FIG. 1. Alternately or additionally, the first, second, and third smart devices 240, 250, 260 may be similar and/or correspond to the smart devices 114-117, 124-128, 134-136 of FIG. 1; the electricity generator 280 may be similar and/or correspond to the electricity generator 137 of FIG. 1; and the unit 200 may be similar and/or correspond to the units 110, 120, 130 of FIG. 1.

The electricity monitoring system 220 may include, but is not limited to, a transceiver module 222, an electricity detection module 224, a prediction module 226, a determination module 228, a demand response module 232, an interface module 234, a processor 236, and a memory 238.

The transceiver module 222 may be configured to receive an electricity usage report from each of the first, second, and third smart devices 240, 250, 260. In some embodiments, the transceiver module 222 may be configured to receive the electricity usage reports over a wireless network. For example, the transceiver module 222 and the first, second, and third smart devices 240, 250, 260 may be connected over a wireless network using the IEEE 802.11 or IEEE 802.15 standards, for example, among potentially other standards. Alternately or additionally, the transceiver module 222 and the first, second, and third smart devices 240, 250, 260 may communicate by sending communications over conductors used to carry electricity to the first, second, and third smart devices 240, 250, 260 and to other electrical devices in the unit 200. The transceiver module 222 may send the electricity usage reports from the first, second, and third smart devices 240, 250, 260 to the prediction module 226, the electricity detection module 224, and/or the determination module 228.

The electricity detection module 224 may be configured to detect electricity generated by the electricity generator 280. In some embodiments, the electricity generator 280 may generate electricity and supply the electricity to the unit 200. The electricity detection module 224 may detect an amount of electricity generated by the electricity generator 280. Alternately or additionally, the electricity generator 280 may send a signal to the transceiver module 222 indicating the amount of electricity generated by the electricity generator 280. The signal sent by the electricity generator 280 may indicate the amount of electricity being generated and/or a prediction of the amount of electricity that will be generated.

The electricity detection module 224 may further be configured to detect a change in electricity usage of non-smart devices associated with the unit 200. A non-smart device may be any device associated with the unit 200 that uses electricity but does not generate and send an electricity usage report to the electricity monitoring system 220. To detect a change in electricity usage of non-smart devices, the electricity detection module 224 may communicate with the electricity meter 270. The electricity meter 270 may be a smart meter or some other type of electricity meter able to determine a change in the electricity usage of the unit 200.

The electricity meter 270 may indicate to the electricity detection module 224 a change in the electricity usage of the unit 200. The electricity detection module 224 may determine if the change in electricity usage occurred due to a smart device or a non-smart device changing its electricity usage based on the electricity usage reports received from the first, second, and third smart devices 240, 250, 260. Alternately or additionally, the electricity detection module 224 may determine if the change was caused by a non-smart device by analyzing the signature of the electricity usage to determine if the change is associated with a smart-device or non-smart device. The electricity detection module 224 may send data indicating the change of electricity usage and the electricity generated, if any, to the determination module 228 and/or the prediction module 226.

The prediction module 226 may be configured to predict future electricity usage of the unit 200 based on past electricity usage of the unit 200, human behavior associated with electricity usage of the unit 200, environmental conditions, electricity generation by the electricity generator 280, associations among smart and/or non-smart devices, among other factors. In some embodiments, the prediction module 226 may predict future electricity usage by building models of electricity usage of the unit 200. For example, the prediction module 226 may build models using machine learning based on support vector machines, artificial neural networks, or using other types of machine learning.

The prediction module 226 may gather data for building the model to predict electricity usage from multiple sources. Some of these sources may include, the first, second, and third smart devices 240, 250, 260; the electricity detection module 224; networks, such as the World Wide Web; the interface module 234; among other sources. For example, the first, second, and third smart devices 240, 250, 260 may send information regarding human interactions with the first, second, and third smart devices 240, 250, 260. The human interactions with the first, second, and third smart devices 240, 250, 260 may indicate a pattern of usage for the first, second, and third smart devices 240, 250, 260 and/or other human behavior with respect to electricity usage in the unit 200.

In some embodiments, the first, second, and third smart devices 240, 250, 260 may perform predictions for their own electricity usage and send their predicted electricity usage in electricity usage reports along with data of human interactions with the first, second, and third smart devices 240, 250, 260 to the transceiver module 222. The prediction module 226 may use the electricity usage reports along with the data of human interactions to predict electricity usage for the unit 200. Alternately or additionally, the prediction module 226 may make predictions of electricity usage for the first, second, and third smart devices 240, 250, 260 based on data of human interactions and passed to the transceiver module 222 from the first, second, and third smart devices 240, 250, 260. A discussion of predicting electricity usage for the first, second, and third smart devices 240, 250, 260 is provided below with respect to FIGS. 5 and 6.

An example of the prediction module 226 using data of human interactions from a smart device follows. A cable box may be a smart device and may report a cable box user's favorite shows (as determined by, e.g., frequency of viewing) and times of the favorite shows and the cable box's predicted electricity usage sent in an electricity usage report. Based on this data, the prediction module 226 may predict electricity usage for a television, and a sound system connected to the television, for times that correspond with the cable box user's favorite show times because the television and sound system may be used with the cable box to watch the cable box user's favorite shows. Furthermore, the prediction module 226 may predict electricity usage for the unit 200 during those times based on historical electricity usage. For example, the prediction module 226 may predict that a cable box user will not perform other electricity consuming actions, such as vacuuming, cooking on a stove, or utilizing a computer, during the times of the cable box user's favorite shows.

An example of the prediction module 226 using data from a network follows. The prediction module 226 may receive information from a network concerning school breaks or school closures. Based on this information, the prediction module 226 may predict an increase in electricity usage of the unit 200 during the day because of the increased time that a human (or set of humans) associated with the unit 200 is (are) in the unit 200. As another example, the prediction module 226 may receive calendaring information for a human associated with the unit 200. Based on the calendaring information, the prediction module 226 may know when the human will go on vacation or not be at home. The prediction module 226 may predict reduced electricity usage of the unit 200 during these times. For example, the prediction module 226 may assume that during these times that only a refrigerator and/or other minor electricity using devices such as clocks and others may be consuming electricity during this period. As another example, the prediction module 226 may receive information from a network concerning conference rooms scheduled in the unit 200, when the unit 200 is an office space. Based on this information, the prediction module 226 may predict an increase in electricity usage of the unit 200 due to usage of projectors, video conferencing, computers, and other electricity consuming devices.

An example of the prediction module 226 using historical data to predict electricity usage follows. The prediction module 226 may record electricity usage over a period. The recorded electricity usage may indicate that the unit 200 uses an average amount of electricity on weekday mornings. Based on this historical average, the prediction module 226 may predict the unit 200 will continue using this amount of electricity on weekday mornings. As another example, the prediction module 226 may record electricity usage to determine electricity usage of the unit 200 during the day when the unit 200 is an office building. The recorded electricity usage may indicate that the unit 200 uses an average amount of electricity during the weekdays and less during the weekends. Furthermore, the recorded electricity usage may indicate that the unit 200 uses less electricity during a lunch hour and late afternoon than during the morning and early afternoon. Based on this historical average, the prediction module 226 may predict the unit 200 will continue using this amount of electricity during the noted times.

An example of the prediction module 226 using associations among smart and/or non-smart devices to predict electricity usage follows. An association among smart and/or non-smart devices may indicate that when one device has increased electricity usage another device may have increased electricity usage. For example, usage of a washer may indicate increased electricity usage of a dryer in the near future to dry the items being washed. As another example, usage of a coffee maker may indicate usage of a toaster, stove, and/or microwave to make breakfast. As another example, usage of an oven may indicate increased electricity usage of a refrigerator due to the refrigerator being opened to collect the food being cooked in the oven and due to the increased temperature near the refrigerator caused by using the oven, increased electricity usage of a dishwasher to clean the utensils and other objects used to prepare what is cooking in the oven, increased electricity usage of the air conditioner during the summer months because of the increased heat in the unit 200 produced by the oven, and decreased electricity usage of a furnace or other heater device in the winter months because of the increased heat in the unit 200 produced by the oven. As another example, usage of a computer in the unit 200, when the unit 200 is an office or office space, may indicate usage of lights in the unit 200, usage of a copy machine, and increased usage of the heating and/or cooling system of the office. Furthermore, usage of the computer in the unit 200 may indicate usage of a server in the office, which may lead to increased electricity usage of the server to handle requests from the computer.

The prediction module 224 may predict the electricity usage of the unit 200 for different amounts of time. For example, the prediction module 224 may predict the electricity usage of the unit 200 for 1 hour, 2 hours, 12 hours, 1 day, or some other period. The prediction module 224 may also update a prediction at a set interval or when new data is available that changes the prediction. The prediction module 224 may send the predicted electricity usage of the unit 200 to the determination module 228. In some embodiments, the predicted electricity usage of the unit 200 may contain the entire electricity usage of the unit 200 and may incorporate or be based on electricity usage reports from the first, second, and third smart devices 240, 250, 260. In other embodiments, the predicted electricity usage of the unit 200 may not incorporate or be based on the electricity usage reports from the first, second, and third smart devices 240, 250, 260.

The determination module 228 may be configured to generate a unit electricity usage report for the unit 200. The determination module 228 may use the current electricity usage of the unit 200, the predicted electricity usage of the unit 200 received from the prediction module 224; electricity usage reports from the first, second, and/or third smart devices 240, 250, 260, whether incorporated in the predicted electricity usage of the unit 200 or separate from the predicted electricity usage of the unit 200; and an amount of electricity generated or the predicted amount of electricity generated by the electricity generator 280, to generate a unit electricity usage report.

In some embodiments, one or more of the electricity usage reports from the first, second, and/or third smart device 240, 250, 260 may contain an indication of the current operational profile and not electricity usage. In these and other embodiments, the determination module 228 may be configured to determine the electricity usage of a smart device for which the electricity usage report indicates the current operational profile but not the electricity usage. The determination module 228 may include the determined amount of electricity usage for the smart device in the unit electricity usage report. For example, both the first and second smart device 240, 250 may send electricity usage report. The electricity usage report from the first smart device 240 may indicate electricity usage of the first smart device 240. The electricity usage report from the second smart device 250 may indicate the current operational profile but not the electricity usage of the second smart device 250. Based on the current operational profile of the second smart device 250, the determination module 228 may calculate the electricity usage of the second smart device 250. The determination module 228 may then generate a unit electricity usage report that contains the electricity usage of both the first and second smart devices 240, 250.

In some embodiments, the electricity monitoring system 220 may not include the prediction module 226. In these and other embodiments, the determination module 228 may use electricity usage reports from the first, second, and/or third smart devices 240, 250, 260, with the received amount of electricity generated and used by non-smart devices, if any, to generate the unit electricity usage report. The determination module 228 may send the unit electricity usage report to the transceiver module 222.

In some embodiments, the unit electricity usage report may not contain information concerning individual device electricity usage or generation, but rather may be an aggregate of all electricity usage of the unit 200. The unit electricity usage report containing an aggregate of all electricity usage and no additional information may allow for increased privacy of humans associated with the unit 200 as compared to reporting individual device electricity usage to a provider of electricity.

The transceiver module 222 may further be configured to transmit the unit electricity usage report to a provider of electricity for the unit 200. The transceiver module 222 may transmit the unit electricity usage report to the provider of electricity for the unit 200 using the various configurations discussed above with respect to FIG. 1 or in a different manner. The transceiver module 222 may further be configured to receive an indication of reduced electricity supply from the provider of electricity for the unit 200. The transceiver module 222 may send the indication of reduced electricity supply to the demand response module 232. In some embodiments, the transceiver module 222 may contain a single interface for receiving and transmitting to the first, second, and third smart devices 240, 250, 260 and the provider of electricity. In other embodiments, the transceiver module 222 may contain two or more interfaces. One or more interfaces for receiving and transmitting to the first, second, and third smart devices 240, 250, 260 and one or more interfaces for receiving and transmitting to the provider of electricity.

The demand response module 232 may be configured to receive the indication of reduced electricity supply from the provider of electricity and to select one or more of the plurality of smart devices for reduced electricity usage based on an indication of reduced electricity supply. The indication of reduced electricity supply from the provider of electricity may indicate that the provider of electricity may not be able to supply electricity to meet the current demands or current predicted demands of the unit 200 and/or other units to which the provider supplies electricity. Alternately or additionally, the indication of reduced electricity supply may indicate an increase in a cost for electricity during the period of reduced electricity supply. When the provider is unable to supply the demanded electricity, the provider may request that the unit 200 reduce its current or future demand of electricity by sending the indication of reduced electricity supply. The indication of reduced electricity supply may indicate an amount of demand that is requested to be curtailed. In some embodiments, the demand response module 232 may receive an indication of an increase in a cost for electricity that is not accompanied by an indication of reduced electricity supply.

The demand response module 232 may select one or more of the first, second, and third smart devices 240, 250, 260 for reduced electricity usage to meet the amount of demand that is requested to be curtailed. Alternately or additionally, the demand response module 232 may select one or more of the first, second, and third smart devices 240, 250, 260 for reduced electricity usage during periods of increased costs for electricity to reduce total costs for electricity usage associated with the unit 200. The demand response module 232 may selected one or more of the first, second, and third smart devices 240, 250, 260 that is currently consuming electricity or that is predicted to consume electricity during the time of reduced supply. After selecting one or more of the first, second, and third smart devices 240, 250, 260, the demand response module 232 sends a request to the selected first, second, and third smart devices 240, 250, 260 to reduce their usage. An example of how the first, second, and third smart devices 240, 250, 260 may respond to the reduced usage request is described with respect to FIG. 5.

When selecting a device for reduced electricity usage, the demand response module 232 may consider input from a user regarding what devices should have their electricity usage reduced during a time of reduced supply and/or increased electricity costs. For example, the user may indicate a cost threshold for electricity usage or smart devices whose usage may be curtailed to meet a request for reduced usage. The demand response module 232 may also receive data from the prediction module 226 to determine associated devices that may have their electricity usage reduced. Where usage of a second device depends on usage of a first device, by selecting the first device that is associated with the second device for reduced usage, the demand response module 232 may further reduce usage because the second device will also have reduced usage based on the usage reduced by the first device without the demand response module 232 having to direct the second device to reduce usage.

The interface module 234 may be configured to receive input from a user. For example, the user may input preferences for selection of smart devices to have reduced power usage during a time of reduced electricity supply. The interface module 234 may also be configured to present data to a human associated with the unit 200. The data may indicate past, current, or predicted future electricity usage of the unit 200 as a whole, for individual or groups of smart devices, for non-smart devices, or some combination thereof.

In some embodiments, the processor 236 may be configured to execute computer instructions that cause the electricity monitoring system 220 to perform the functions and operations described herein. The computer instructions may be loaded into the memory 238 for execution by the processor 236 and/or data generated, received, or operated on during performance of the functions and operations described herein may be at least temporarily stored in the memory 238.

Although the electricity monitoring system 220 illustrates various discrete components, such as the prediction module 226 and the determination module 228, various components may be divided into additional components, combined into fewer components, or eliminated, depending on the desired implementation. In some embodiments, the unit 200 may be associated with more or less smart devices than the three smart devices 240, 250, 260 illustrated in FIG. 2. Alternately or additionally, the unit 200 may not be associated with the electricity generator 280.

Figure 3:
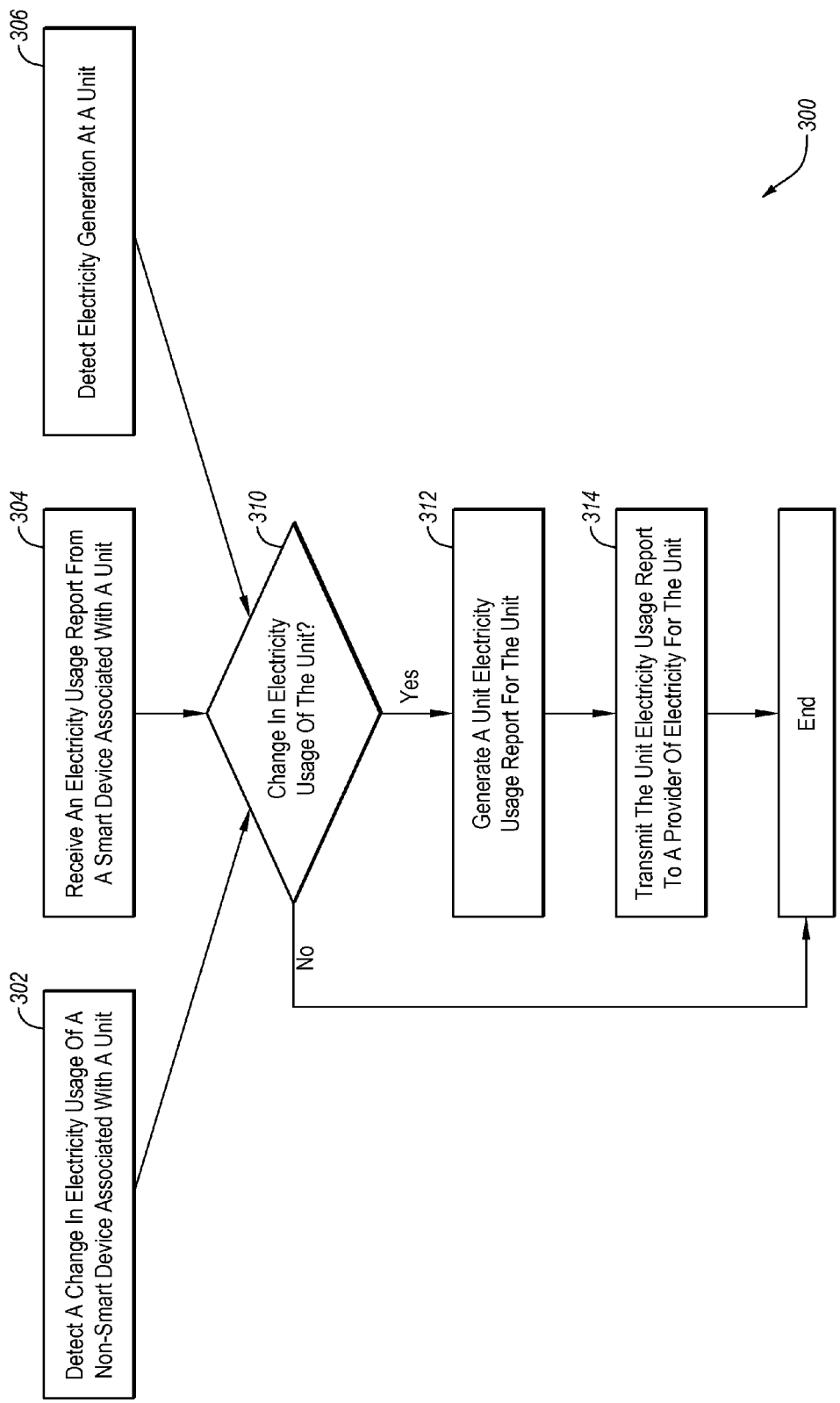
FIG. 3 is a flow chart of an example method of monitoring electricity usage of a unit.

FIG. 3 is a flow chart of an example method 300 of monitoring electricity usage of a unit, arranged in accordance with at least some embodiments described herein. The method 300 may be implemented, in some embodiments, by an electricity monitoring system, such as the electricity monitoring system 220 of FIG. 2. For instance, the processor 236 of FIG. 2 may be configured to execute computer instructions to perform operations for monitoring electricity usage as represented by one or more of blocks 302, 304, 306, 310, 312, and/or 314 of the method 300. Although illustrated as discrete blocks, various blocks may be divided into additional blocks, combined into fewer blocks, or eliminated, depending on the desired implementation.

The method 300 may begin at one or more of blocks 302, 304, and/or 306. The blocks 302, 304, and/or 306 may occur at the same time or at different times and may or may not depend on one another. Furthermore, one or more of the block 302, 304, 306 may occur during the method 300. For example, the method 300 may complete when blocks 304, 310, and 312 occurs and without the occurrence of block 302 and 306.

In block 302, a change in electricity usage of a non-smart device associated with a unit may be detected. A non-smart device may by any device that uses electricity and does not generate an electricity usage report indicating its electricity usage. A unit may be a residential dwelling, such as, but not limited to, a single family home, an apartment complex, a condominium, a townhome, and other residences; a commercial building, such as, but not limited to, a store and an office; or the like or any combination thereof.

A change in the electricity usage of a non-smart device may be detected using an electricity detection module and/or an electricity meter associated with the unit, such as the electricity detection module 224 and/or the electricity meter 270 of FIG. 2. After a change in electricity usage of the non-smart device is detected, the method 300 proceeds to block 310.

In block 304, an electricity usage report from a smart device associated with the unit may be received. A smart device may be a device that consumes electricity and generates and transmits an electricity usage report indicating the electricity usage of the smart device. The electricity usage report may indicate predicted future electricity usage of the smart device. In some embodiments, an electricity usage report may be received at set intervals from the smart device regardless of a change in the electricity usage report. Alternately or additionally, an electricity usage report may be received after a change in the electricity usage of the smart device results in a change to the electricity usage report. After an electricity usage report is received from the smart device, the method 300 proceeds to block 310.

In block 306, electricity generation at the unit may be detected. Electricity generation at the unit may be detected using an electricity detection module, such as the electricity detection module 224 of FIG. 2. After detecting electricity generation at the unit, the method proceeds to block 310.

At block 310, it is determined if a change in the electricity usage occurred for electricity provided by a provider of electricity for the unit. For example, if an increase in electricity generation occurs at the same time and at the same amount as an increase in the electricity usage of a non-smart device, a change in the electricity usage as provided by a provider of electricity for the unit may not occur. If a change in the electricity usage occurs, the method 300 proceeds to block 312. If no change occurs, the method 300 ends.

At block 312, a unit electricity usage report is generated for the unit. In some embodiments, the unit electricity usage report may indicate the current electricity usage of the unit. Alternately or additionally, the unit electricity usage report may indicate a current and predicted future electricity usage of the unit.

At block 314, the unit electricity usage report is transmitted to a provider of electricity for the unit, such as a utility company. The unit electricity usage report may be transmitted to the provider of electricity using one or more networks, such as a neighborhood network formed by smart meters; a public network, such as the World Wide Web; and/or a network of the provider of electricity. In some embodiments, the unit electricity usage report may be transmitted when the unit electricity usage report indicates a change in electricity usage for the unit that is greater than a predetermined threshold. If the unit electricity usage report indicates a change in electricity usage for the unit that is less than the predetermined threshold, the unit electricity usage report may not be transmitted to the provider of electricity.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 300 may further include receiving, at the unit, an indication of reduced electricity supply from the provider of electricity. The method 300 may further include selecting one or more smart devices associated with the unit for reduced electricity usage based on the received indication of reduced electricity supply. The one or more smart devices for reduced usage may be selected based on preferences of a human associated with the unit, the amount of reduced electricity supply, the association of the one or more smart devices with other smart devices and/or non-smart devices, among other factors.

Figure 4:
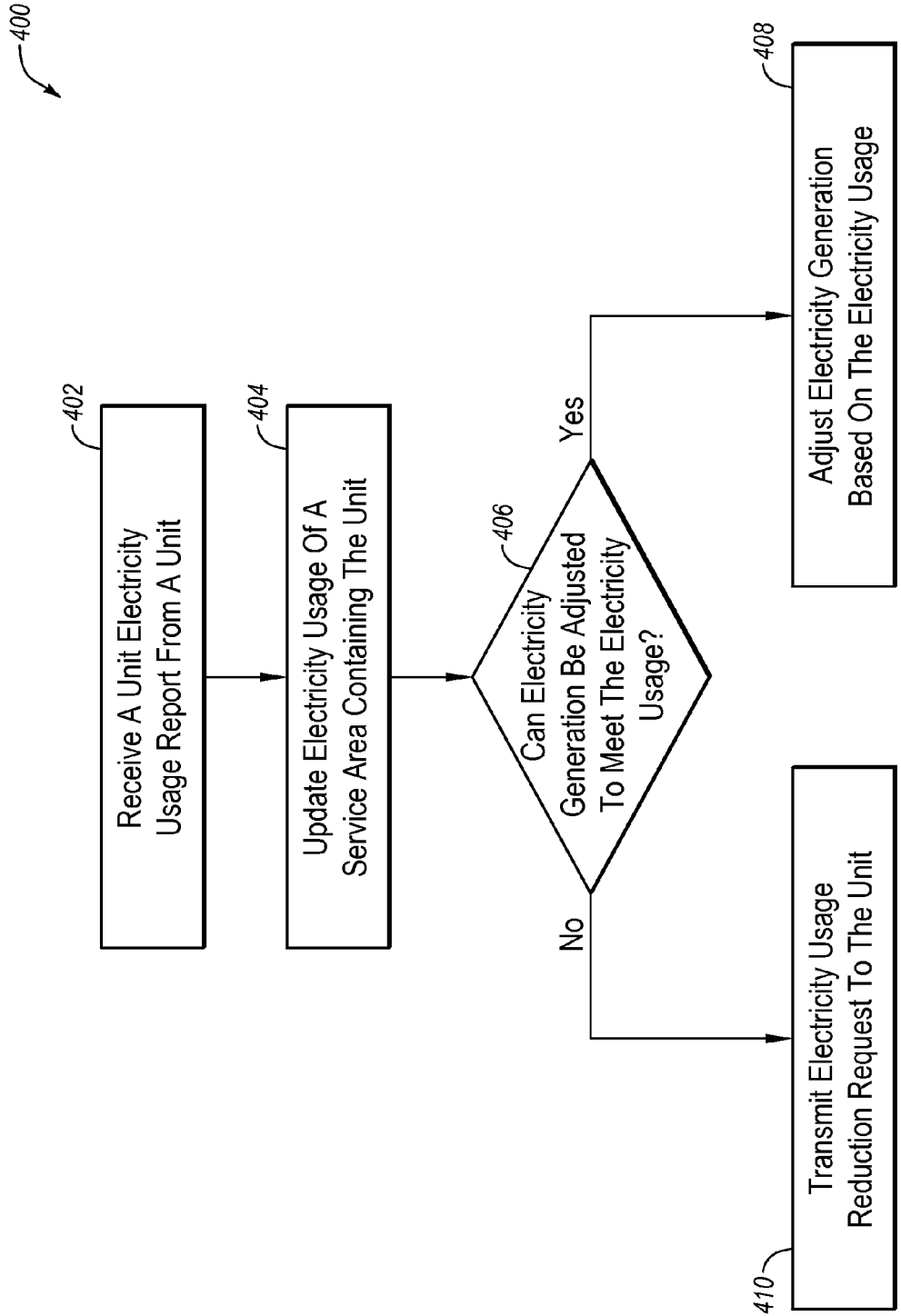
FIG. 4 is a flow chart of an example method of managing electricity usage.

FIG. 4 is a flow chart of an example method 400 of managing electricity usage, arranged in accordance with at least some embodiments described herein. The method 400 may be implemented, in some embodiments, by a provider network, such as the provider network 160 of FIG. 1. For instance, a processor or processors within the provider network 160 of FIG. 1 may be configured to execute computer instructions to perform operations for managing electricity usage as represented by one or more of blocks 402, 404, 406, 408, and/or 410 of the method 400. Although illustrated as discrete blocks, various blocks may be divided into additional blocks, combined into fewer blocks, or eliminated, depending on the desired implementation.

The method 400 may begin at block 402, where a unit electricity usage report may be received. The unit electricity usage report may be generated and transmitted by a unit, such as the unit 200 of FIG. 2. The unit electricity usage report may contain the current and/or predicted future electricity usage of the unit that transmitted the unit electricity usage report.

At block 404, the electricity usage of a service area containing the unit that transmitted the unit electricity usage report may be updated based on the unit electricity usage report.

At block 406, it is determined if electricity generation may be adjusted to meet the electricity usage of the service area. When the electricity generation needs to be increased to meet the electricity usage of the service area but the electricity provider is unable to increase the electricity generation enough to meet the electricity usage, the method 400 may proceed to block 410. If electricity generation may be increased or decreased to meet the electricity usage, the method 400 may proceed to block 408.

At block 408, electricity generation may be adjusted based on the current and/or predicted electricity usage of the service area. The electricity generation may be adjusted by generating more or less electricity for the service area to meet the electricity usage of the service area.

At block 410, an electricity usage reduction request may be transmitted to the unit. The electricity usage reduction request may request the unit to reduce its electricity usage.

Figure 5:
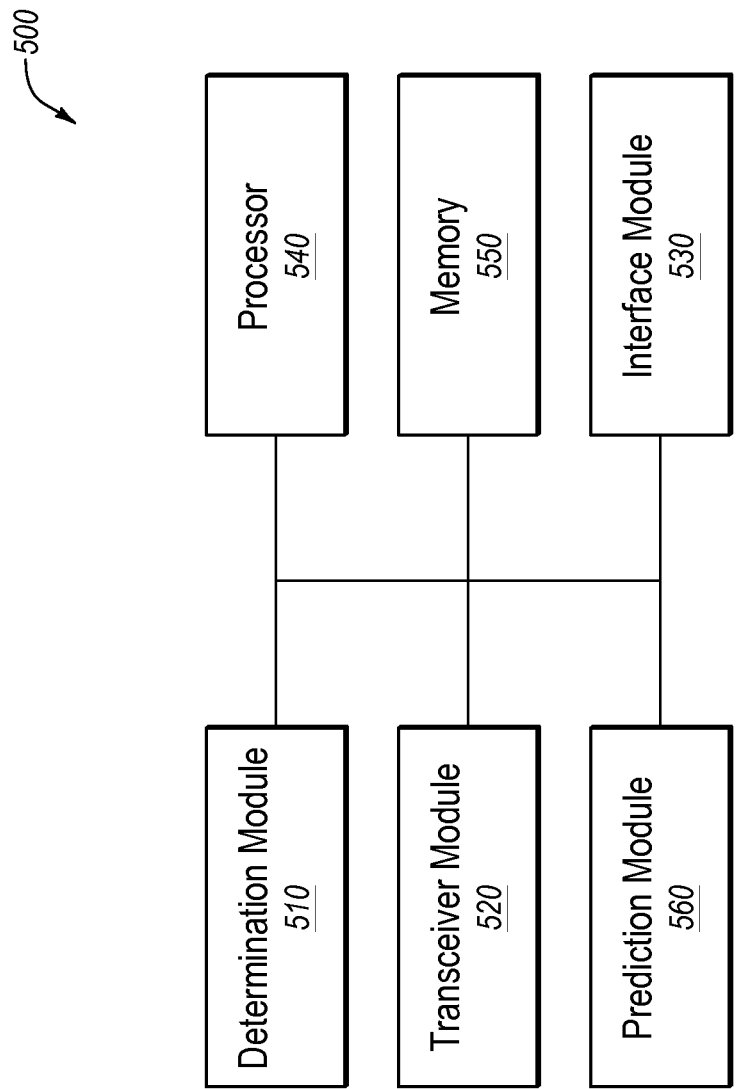
FIG. 5 is a block diagram of an example smart device that may be included in the smart grid of FIG. 1.

FIG. 5 is a block diagram of an example smart device 500 that may be included in the smart grid 100 of FIG. 1, arranged in accordance with at least some embodiments described herein. The smart device 500 may include, but is not limited to, a determination module 510, a transceiver module 520, a prediction module 560, an interface module 530, a processor 540, and a memory 550.

The smart device 500 may be a device configured to consume electricity and to generate an electricity usage report indicating the electricity usage of and/or a current operational profile of the smart device 500. The smart device 500 may be an appliance; such as, a refrigerator, a washer, a dryer, a stove, an oven, a microwave, a dishwasher, a toaster, a coffee maker, a water heater, a space heater, a furnace, or an air conditioning unit, among others; a consumer electronic device, such as a sound system, a DVD and blue-ray player, a television, a desktop computer, a laptop computer, a cable box, a gaming console, among others; or other devices.

The smart device 500 may be configured to have one or more operational profiles. In some embodiments, these operational profiles may include, but are not limited to, a standby profile, an operations profile, a suspend operations profile, and a power-off profile. In some embodiments, the operational profile may include multiple different operational sub-profiles for different modes of operation for the smart device 500. In some embodiments, the smart device 500 may have multiple selectable ranges of operations within an operational profile or sub-profile. For each operational profile, operational sub-profile, and/or selected range of operations for those operational profiles and sub-profiles, the smart device 500 may have predetermined electricity usage information stored in the memory 550 or some other memory within the smart device 500 or have one or more equations, tables, or the like, for calculating the predetermined electricity usage.

For example, the smart device 500 may be a microwave. The microwave may include an operational profile with multiple different operational sub-profiles, such as, defrost, reheat, time cook, power level selection, among others. For each of the different sub-profiles, a user of the microwave may select a time (i.e., the selectable range of operations) for the defrosting, reheating, cooking, etc. The microwave may also have a suspend profile, for example, for when a user stops operation of the microwave temporarily. The microwave may also have a standby profile that is used when the microwave is not in use. For each of these profiles, sub-profiles, and selected range of operations within the profiles, the microwave may use a predetermined amount of electricity. For example, the microwave may use 1000 Watts to cook for 1 minute, 500 Watts to defrost for 1 minute, and 5 Watts in standby mode. The microwave may have a table in which is stored the predetermined amount of electricity that is used for each operational profile, operational sub-profile, and/or selected range of operations or one or more equations that allow the microwave to calculate the predetermined electricity used for each operational profile, operational sub-profile, and/or selected range of operations.

Other non-limiting examples of smart devices for which the predetermined electricity usage of the smart device may be stored or calculated based on a known time frame of operations include ovens with a timer, coffee makers, washer, dryers, toasters, air conditioners, water heaters, heaters, refrigerators, among others.

The interface module 530 may be configured to receive and/or record data indicating user interactions with the smart device 500. The user input may include a user selection of an operational profile, operational sub-profile, and/or range of operations for an operational profile and/or sub-profile of the smart device 500. The user interactions may also include other user interactions with the smart device 500 instead of or in addition to the selection of operational profiles, operational sub-profiles, and/or range of operations for an operational profile and/or sub-profiles. For example, the user interactions may include a user stopping the smart device 500 during operation. For example, if the smart device 500 is a dryer, a user could set the dryer for a selected drying cycle and then stop the dryer before the cycle was complete.

The interface module 530 may directly or indirectly receive and/or record data indicating user interactions. For example, in some embodiments, the interface module 530 may be a panel that a user touches or controls to select operational profiles of the smart device 500. Alternately or additionally, the interface module 530 may receive and/or record data indicating user interactions indirectly from a panel that a user touches or controls. The interface module 530 may send the data indicating the user interactions to the determination module 510 and/or the prediction module 560.

The determination module 510 may receive the data indicating the user interactions from the interface module 530. In some embodiments, the determination module 510 may note a time of day, the frequency of the user interactions throughout a set period, such as a day, week, or month, and other information regarding the user interactions with the smart device 500. Alternately or additionally, the interface module 530 may note other information regarding the user interactions and send this information to the determination module 510. The determination module 510 may save this information in the memory 550 or some other memory device.

Based on the selected operational profile, operational sub-profile, and/or range of operations for an operational profile and/or sub-profile of the smart device 500, the determination module 510 may determine the electricity usage of the smart device 500 based on the stored predetermined electricity usage information for the profiles, sub-profiles, and range of operations or based on the one more equations for calculating the predetermined electricity usage for each operational profile, operational sub-profile, and selected range of operations. After determining the electricity usage of the smart device 500, the determination module 510 may generate an electricity usage report indicating the electricity usage of the smart device 500. The electricity usage report may also include the data indicating the user interactions and/or information about the user interactions with the smart device 500. Alternately or additionally, the determination module 510 may generate an electricity usage report indicating the operational profile of the smart device 500 without indicating the electricity usage of the smart device 500.

In some embodiments, the electricity usage of the smart device 500 may be determined by the prediction module 560. In these and other embodiments, the prediction module 560 may predict the electricity usage for the smart device 500 and send the predicted electricity usage to the determination module 510. The determination module 510 may include the predicted electricity usage of the smart device 500 in the electricity usage report. After generating the electricity usage report, the determination module 510 may send the electricity usage report to the transceiver module 520.

The determination module 510 may be further configured to handle reduced usage requests from an electricity monitoring system associated with the smart device 500. In some embodiments, the reduced usage request may direct the smart device to operate using a specific operational profile, such as a power-off, a standby, or a suspend operations profile. Alternately or additionally, the reduced usage request may contain the requested electricity reduction amount and may allow the determination module 510 to select an operational profile to meet the requested electricity reduction.

The transceiver module 520 may be configured to send an electricity usage report to an electricity monitoring system and to receive a reduced usage request from an electricity monitoring system. The transceiver module 520 may also be configured to send data regarding human interactions with the smart device 500 to an electricity monitoring system for a unit with which the smart device 500 is associated. In some embodiments, the transceiver module 520 may send and receive data over a wireless network according to a given standard, such as, IEEE 802.11, IEEE 802.15, or some other standard. Alternately or additionally, the transceiver module 520 may send and receive data over conductors used to carry electric power for a unit with which the smart device 500 is associated.

The prediction module 560 may be configured to predict future electricity usage of the smart device 500 based on current and past user interactions with the smart device 500 as collected by the interface module 530, predetermined electricity usage for each operational profile, operational sub-profile, and/or selected range of operations for those operational profiles and sub-profiles for the smart device 500, data received from an electricity monitoring system associated with the smart device 500, data from networks, such as the World Wide Web, and other sources of information. The data from the electricity monitoring system may include human behaviors regarding other devices that may be associated with the smart device 500 or general human behaviors with respect to electricity usage of a unit with which the smart device 500 is associated. The prediction module 560 may function similar to the prediction module 226 of FIG. 2. The prediction module 560 may send the predicted electricity usage for the smart device 500 to the determination module 510 for inclusion in the electricity usage report.

In some embodiments, the prediction module 560 may predict future electricity usage by building models of electricity usage of the smart device 500. For example, the prediction module 560 may build models using machine learning based on support vector machines, artificial neural networks, or other types of machine based learning using the above-described types of data.

As an example of the operation of the prediction module 560, the prediction module 560 may determine a predetermined electricity usage for a selected operational profile and range of operation for the smart device. Based on past user interactions, the prediction module 560 may predict that the user may not have the smart device perform the selected operational profile for the full range of operation. The prediction module 560 may reduce the electricity usage from the predetermined amount accordingly.

For example, the smart device 500 may be a microwave. The user may select a cooking time of one minute. Historically, when a user selects a cooking time of one minute, the user may stop the microwave after only 15, 30, or 45 seconds. The prediction module 560 may predict that the user will stop the microwave before the microwave operates for the full one minute and thus determine electricity usage less than the predetermined amount for one minute of cooking. As another example, the smart device 500 may be a cable box. The user may select a show to watch that is one hour long. Historically, when a user selects a show of one hour, the user may watch the entire show; however, on Fridays between 7 and 8 o'clock, the user may only watch a show for an average of 35 minutes. On Fridays, the prediction module 560 may predict that the user will watch for 35 minutes and thus determine electricity usage less than the predetermined amount for a one-hour show.

In some embodiments, the processor 540 may be configured to execute computer instructions that cause the smart device 500 to perform the functions and operations described herein. The computer instructions may be loaded into the memory 550 for execution by the processor 540 and/or data generated, received, or operated on during performance of the functions and operations described herein may be at least temporarily stored in the memory 550.

The smart device 500 as discussed above may provide for various advantages. For instance, a manufacturer of the smart device 500 may not need to disclose device operations to allow an outside device, such as an electricity monitoring system, to determine electricity usage for a selected operational profile because the smart device 500 may determine and send its electricity usage and/or predicted electricity usage. Alternately or additionally, when the smart device 500 is upgraded or the smart device 500 is newly associated with a unit, an electricity management system associated with the unit does not need to be upgraded or changed to determine the electricity usage of the smart device 500 because the smart device 500 may report its electricity usage to the electricity management system.

Although the smart device 500 illustrates various discrete components, such as the prediction module 560 and the determination module 510, various components may be divided into additional components, combined into fewer components, or eliminated, depending on the desired implementation.

Figure 6:
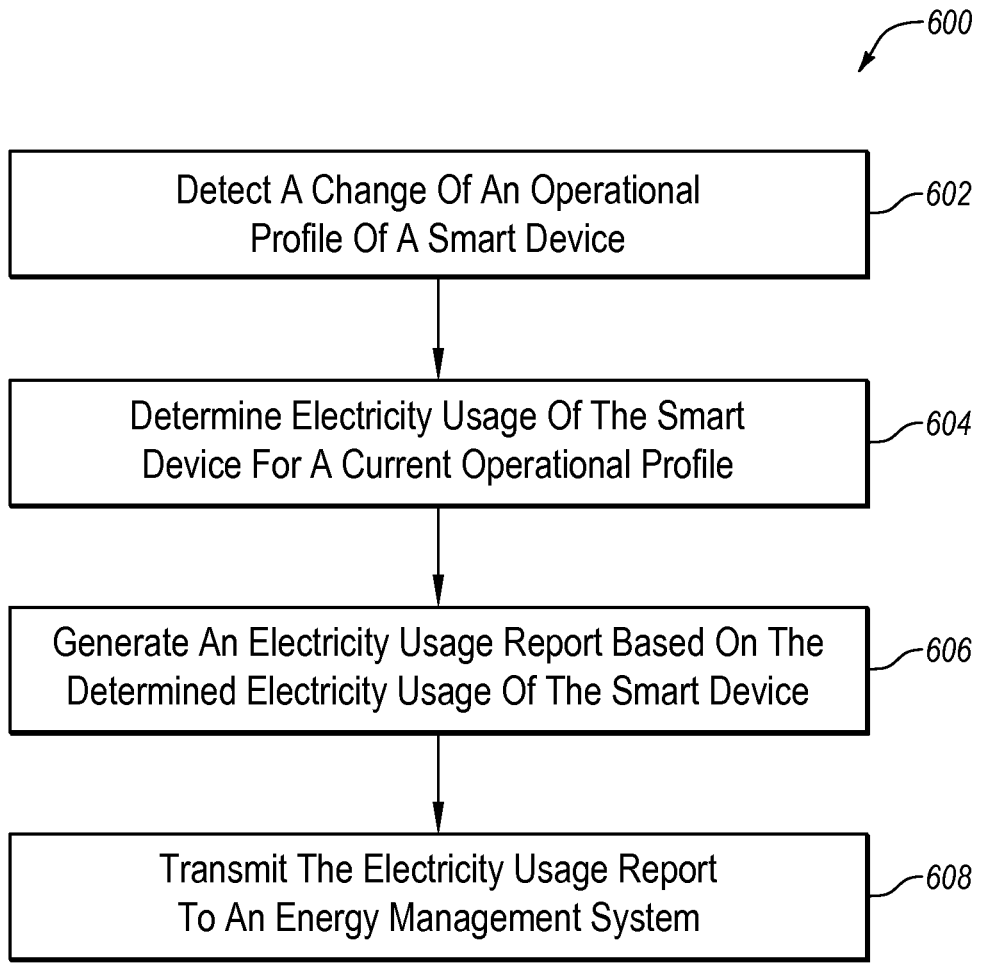
FIG. 6 is a flow chart of an example method of monitoring electricity usage of a smart device.

FIG. 6 is a flow chart of an example method 600 of monitoring electricity usage of a smart device, arranged in accordance with at least some embodiments described herein. The method 600 may be implemented, in some embodiments, by a smart device, such as the smart device 500 of FIG. 5. For instance, the processor 540 of the smart device 500 of FIG. 5 may be configured to execute computer instructions for monitoring electricity usage of a smart device as represented by one or more of blocks 602, 604, 606, and/or 608 of the method 600. Although illustrated as discrete blocks, various blocks may be divided into additional blocks, combined into fewer blocks, or eliminated, depending on the desired implementation.

The method 600 may begin at block 602, where a change of an operational profile of a smart device may be detected. A change of an operational profile may include a change of the type of operational profile, a change of the type of operational sub-profile for a selected operational profile, and/or a change of a range of operations of an operational profile and/or operational sub-profile. A change of an operational profile of a smart device may affect the electricity usage of the smart device.

At block 604, electricity usage of the smart device may be determined for a current operational profile. The current operational profile may be the operational profile after the detected change of an operational profile. The electricity usage of the smart device for the current operational profile may be determined based on predetermined electricity usage information for the operational profiles, operational sub-profiles, and range of operations for the operational profiles and sub-profiles. In some embodiments, the electricity usage of the smart device may be predicted based on past user interactions with the smart device that affected the electricity usage of the smart device, past electricity usage of the smart device, the predetermined electricity usage information, among other factors.

At block 606, an electricity usage report may be generated based on the determined electricity usage of the smart device. The determined electricity usage of the smart device may be the predicted electricity usage of the smart device. The electricity usage report may include the determined electricity usage of the smart device as well as the other information collected by the smart device, such as user interactions with the smart devices, the current and past operational profile of the smart device, among other information. Alternately or additionally, the electricity usage report may include other information collected by the smart device and not include a determined or predicted electricity usage of the smart device.

At block 608, the electricity usage report may be transmitted to an energy management system. The energy management system may use the electricity usage report to determine electricity usage of a unit with which the smart device is associated. The electricity usage report may provide the energy management system with a fine-grain electricity usage report for the smart device.

Figure 7:
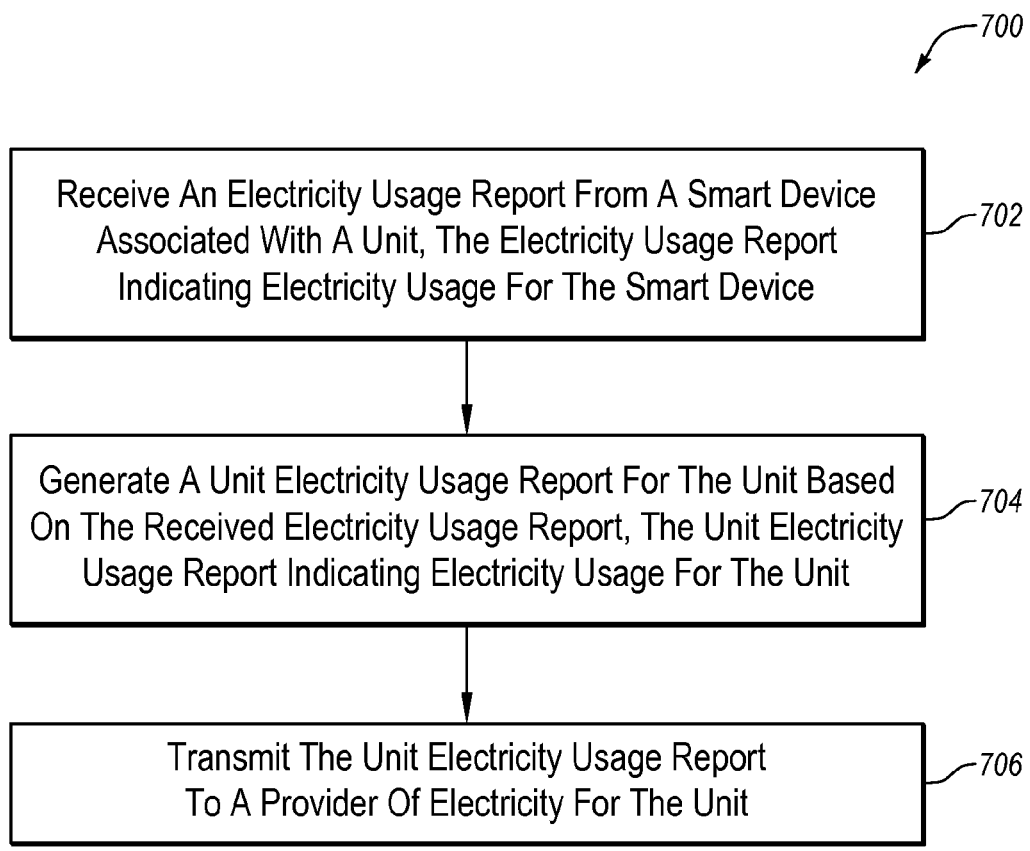
FIG. 7 is a flow chart of an example method of monitoring electricity usage, all arranged in accordance with at least some embodiments described herein.

FIG. 7 is a flow chart of an example method 700 of monitoring electricity usage, arranged in accordance with at least some embodiments described herein. The method 700 may be implemented, in some embodiments, by an electricity monitoring system, such as the electricity monitoring system 220 of FIG. 2. For instance, the processor 236 of FIG. 2 may be configured to execute computer instructions to perform operations for monitoring electricity usage as represented by one or more of blocks 702, 704, and/or 706 of the method 700. Although illustrated as discrete blocks, various blocks may be divided into additional blocks, combined into fewer blocks, or eliminated, depending on the desired implementation.

The method 700 may begin at block 702, where an electricity usage report may be received from a smart device associated with a unit, the electricity usage report may indicate electricity usage for the smart device. The electricity usage report may be the smart device's own determination of the electricity usage of the smart device. The electricity usage report may include additional information from the smart device besides the electricity usage of the smart device. For example, the electricity usage report may include smart device user interactions with the smart device, an operational profile of the smart device, among other information. In some embodiments, the electricity usage report may be based on human behavior associated with the smart device that affects electricity usage of the smart device. Alternately or additionally, the electricity usage report may be based on a predicted amount of electricity usage based on past electricity usage of the smart device for the current operational profile.

At block 704, a unit electricity usage report may be generated for the unit based on the received electricity usage report; the unit electricity usage report may indicate electricity usage for the unit. In some embodiments, the unit electricity usage report may be based on past human behavior that affected an amount of electricity used by the unit. Alternately or additionally, the unit electricity usage report may include a predicted electricity usage of the unit. Alternately or additionally, the unit electricity usage report may also be based on an indication of electricity generation at the unit.

At block 706, the unit electricity usage report may be transmitted to a provider of electricity for the unit. The provider of electricity for the unit may use the unit electricity usage report in combination with unit electricity usage reports from other units to determine electricity demand for a service area. The provider of electricity being able to determine electricity demand for a service area may increase accuracy in matching electricity generation with electricity demand.

The method 700 may further include detecting a change in electricity usage of a non-smart device associated with the unit. In these and other embodiments, the unit electricity usage report may be based on the change in the electricity usage of the non-smart device.

The method 700 may further include predicting future electricity usage of a device associated with the smart device and the unit based on the electricity usage report. The predicted future electricity usage of the device may be used in combination with the electricity usage report and other data to generate the unit electricity usage report.

The method 700 may further include receiving an indication of reduced electricity supply from the provider of electricity for the unit and selecting at least one smart device from multiple smart devices that are associated with the unit for reduced electricity usage. The multiple smart devices may include the smart device for which the electricity report is received.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein may be preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. An electricity monitoring system of monitoring electricity usage within a unit, the electricity monitoring system comprising:

a transceiver configured to receive a smart device electricity usage report from a smart device associated with a unit, the smart device configured to consume electricity and to reduce electricity consumption based on a reduced usage request, the smart device electricity usage report indicating predicted electricity usage for the smart device as determined by the smart device, the predicted electricity usage based on one or more of an operational profile of the smart device and user interactions with the smart device that affects electricity usage of the smart device as recorded by the smart device; and a determination module configured to generate a unit electricity usage report for the unit based on the received smart device electricity usage report, the unit electricity usage report indicating electricity usage for the unit, the transceiver further configured to transmit the unit electricity usage report to a provider of electricity for the unit.

2. The system of claim 1, further comprising an electricity detection module configured to detect electricity generation at the unit, wherein the determination module is configured to generate the unit electricity usage report based on the electricity generated at the unit.

3. The system of claim 1, further comprising an electricity detection module configured to detect a change in electricity usage of a non-smart device associated with the unit, wherein the unit electricity usage report is based on the change in the electricity usage of the non-smart device.

4. The system of claim 1, further comprising a prediction module configured to predict future electricity usage of a device associated with the smart device and the unit based on the electricity usage report, wherein the determination module is configured to generate the unit electricity usage report based on the predicted future electricity usage of the device.

5. The system of claim 1, wherein the unit electricity usage report is based on past human behavior that affected an amount of electricity used by the unit.

6. The system of claim 1, further comprising a demand response module configured to select one or more of a plurality of smart devices that includes the smart device, the plurality of smart devices being associated with the unit, for reduced electricity usage based on an indication of reduced electricity supply from the provider of electricity for the unit.

7. A computer-implemented method of monitoring electricity usage, the method comprising:

receiving a smart device electricity usage report from a smart device associated with a unit, the smart device configured to consume electricity and to reduce electricity consumption based on a reduced usage request, the smart device electricity usage report indicating predicted electricity usage for the smart device as determined by the smart device, the predicted electricity usage based on one or more of an operational profile of the smart device and user interactions with the smart device that affects electricity usage of the smart device as recorded by the smart device;

generating a unit electricity usage report for the unit based on the received smart device electricity usage report, the unit electricity usage report indicating electricity usage for the unit; and transmitting the unit electricity usage report to a provider of electricity for the unit.

8. The method of claim 7, further comprising receiving an indication of electricity generated at the unit, wherein the unit electricity usage report is based on the indication of the electricity generation at the unit.

9. The method of claim 7, further comprising detecting a change in electricity usage of a non-smart device associated with the unit, wherein the unit electricity usage report is based on the change in the electricity usage of the non-smart device.

10. The method of claim 7, further comprising predicting future electricity usage of a device associated with the smart device and the unit based on the electricity usage report.

11. The method of claim 7, wherein the unit electricity usage report is based on past human behavior that affected an amount of electricity used by the unit.

12. The method of claim 7, further comprising receiving an indication of reduced electricity supply from the provider of electricity for the unit and selecting at least one smart device from a plurality of smart devices that includes the smart device and that are associated with the unit for reduced electricity usage.

13. A computer-implemented method of controlling electricity production, the method comprising:

receiving a unit electricity usage report of a unit, the unit electricity usage report based at least partially on a smart device electricity usage report from a smart device associated with the unit, the smart device configured to consume electricity and to reduce electricity consumption based on a reduced usage request, the smart device electricity usage report indicating predicted electricity usage for the smart device as determined by the smart device, the predicted electricity usage based on one or more of an operational profile of the smart device and user interactions with the smart device that affects electricity usage of the smart device as recorded by the smart device; and adjusting electricity generation based on the unit electricity usage report.

14. A computerized smart device for use in an energy monitoring system and configured to consume electricity and to reduce electricity consumption based on a reduced usage request, the smart device comprising:

an interface module configured to receive user interactions with a smart device;

a prediction module configured to predict electricity usage for the smart device, the predicted electricity usage based on one or more of an operational profile of the smart device and user interactions with the smart device that affects electricity usage of the smart device as received by the interface module;

a determination module configured to generate a smart device electricity usage report indicating electricity usage for the smart device and the predicted electricity usage for the smart device as determined by the prediction module; and a transceiver module configured to transmit the smart device electricity usage report to an energy monitoring system for a unit with which the smart device is associated.

15. The smart device of claim 14, wherein the unit comprises infrastructure that supplies electricity to the smart device.

16. The smart device of claim 14, wherein the electricity usage for the smart device is based on a predetermined amount of electricity usage for the operational profile of the smart device.

17. The smart device of claim 14, wherein the operational profile of the smart device comprises any one of: a standby profile, an operations profile, a suspend operations profile, or a power-off profile.

* * * * *